Feb. 13, 1923.

O. J. WALTON ET AL.
COTTON GIN.
FILED OCT. 8, 1921.

1,445,373.

Oscar J. Walton.
Jasper L. Beard.
INVENTORS

BY
Mitchell, Chadwick & Kent,
ATTORNEYS

Patented Feb. 13, 1923.

1,445,373

UNITED STATES PATENT OFFICE.

OSCAR J. WALTON AND JASPER L. BEARD, OF DALLAS, TEXAS, ASSIGNORS TO THE MURRAY COMPANY, OF DALLAS, TEXAS, A CORPORATION OF TEXAS.

COTTON GIN.

Application filed October 8, 1921. Serial No. 506,479.

*To all whom it may concern:*

Be it known that we, OSCAR J. WALTON and JASPER L. BEARD, citizens of the United States, residing at Dallas, in the county of Dallas and State of Texas, have invented certain new and useful Improvements in Cotton Gins, of which the following is a specification.

Our invention is an improvement in saw cotton gins, of the type in which the lint is removed from the saws by an air blast, applied tangentially to the teeth of the saws which rotate in juxtaposition to an air nozzle which delivers a blast of air against the saw teeth in the direction in which the teeth are travelling but at much higher speed, so that the lint is stripped from the saw teeth and carried into a lint flue and out of the gin to a condenser, in which the lint is separated from the air current.

Figure 1:
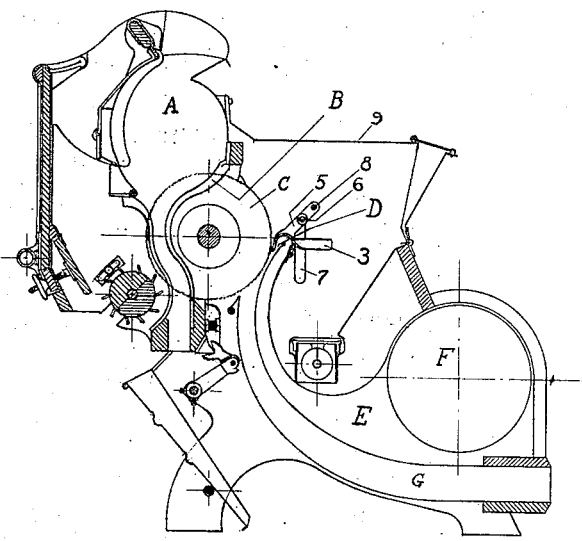
Figure 2:
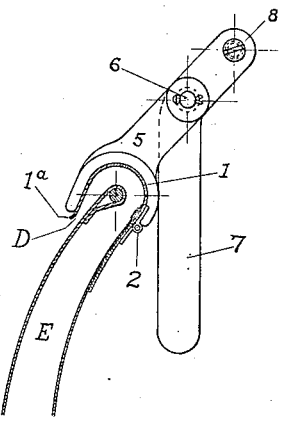
Figure 3:
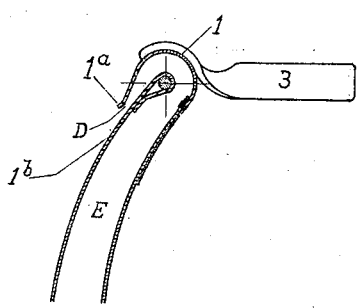
Figure 4:
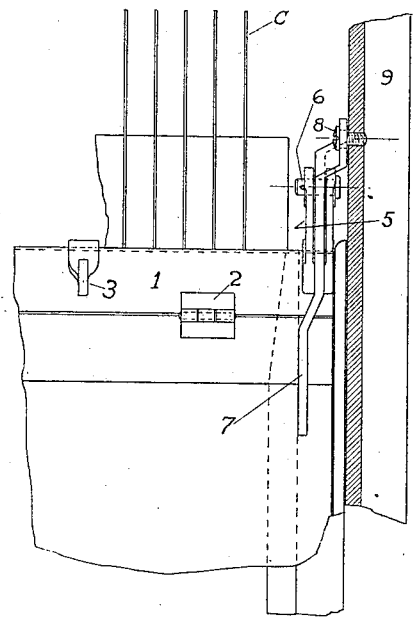

In the drawings, Figure 1 is a cross-sectional elevation of a well-known, air-blast saw cotton gin, to which our invention has been applied; Figure 2 is a detail, on an enlarged scale, of the toggle clamp in side elevation; Figure 3 is a detail, on an enlarged scale, of the pivoted nozzle in section; Figure 4 is a partial front elevation; showing a clamp member and part of the gin and pivoted nozzle.

This improvement relates to cotton gins of an ordinary and familiar saw type, in which the lint is pulled from the cotton seed by a multiplicity of peripherally hooked disks, commonly called saws, which engage the lint in the roll box and draw it through and between ribs, which are so narrowly spaced that the cotton seed cannot follow the lint, which is carried out of the roll box by the saw teeth and then removed from the saw teeth by a blast of air delivered at a suitable point tangent to the circular path of the saw teeth and carried by the air blast into the lint flue and out of the gin. All this is shown in Figure 1, in which A is the roll box in which the seed cotton is deposited; B indicates the ribs; C the saws; D the air nozzle; E the air duct communicating with an air chamber F communicating with a pressure air fan, not shown; G, air duct to the lint flue, through which the lint is carried by an air blast out of the gin. All this is old and well known. It should be understood however that in Figure 1 we have shown our invention added to the old mechanism. In the old mechanism the curved upper end of duct E was integral, and was not hinged or pivoted for movement according to our invention, as is shown in Figure 1.

In the old and well known air blast, saw gin, above briefly described, two difficulties inhered. In order to economically obtain a high velocity air jet, the lips of the air duct must be brought close to the opposing wall to form a narrow slot, in consequence of which, from time to time lint, dust, trash or other extraneous matter drawn in through the fan, lodges in the nozzle D and partially obstructs and interferes with the flow of the air blast at the point of obstruction. Heretofore, when this happened, it has been necessary to shut down the gin stand and remove the saw cylinders from the gin or gins, which was a time and labor consuming operation and a cause of loss and delay to the ginner.

Furthermore, owing to this liability to clog it was not feasible to set the lip of the air nozzle as close to the opposing wall as would otherwise have been desirable. The closer the lip and the narrower the nozzle opening the higher the velocity of the air blast attained by a given power expediture. It is obvious therefore that a closely set lip, forming a narrow air slot, will give the necessary blast velocity at the least power expense.

Referring to the drawings, it will be seen that the upper end of the air duct E is formed of a suitably curved sheet, 1, the free edge of which $1^a$, forms the lip of the air nozzle D, the other surface of the nozzle being formed by the outer face $1^b$ of the air duct E. In our improved device the curved sheet, 1, is hinged at 2 to the upper end of the air duct E and is provided with an operating handle 3, by means of which the curved sheet 1 may be swung upon its pivots 2 to separate the lip $1^a$ from the opposed wall $1^b$ and open the nozzle D. The pivot point upon which the curved sheet, 1, turns in this operation is so positioned that the swinging of the sheet 1 does not cause the lip $1^a$ to move into the path of the saw teeth, so that this operation can be performed without moving the saw cylinder and if desired without stopping the rotation of the saw cylinder. The effect of even a slight pivotal movement of the curved sheet 1 is to release any obstruction and cause the air blast instantly to clear the entire length of the air slot, D.

It is necessary that the nozzle, when in operation should be firm in position and held against accidental displacement, to give the necessary fixity of nozzle width. To secure the necessary fixity we provide clamping members, which should be capable of being released easily and quickly and applied with equal speed and ease.

The clamping members may obviously be of widely various construction. In the drawings we have shown toggle clamps, pivoted at each end of the gin to the inside of the end frames.

The clamping arm 5 is shaped at its lower end to fit the curve of the curved sheet 1, and its upper end is pinned at 6 to the bent lever 7. The lever 7 is pivoted on a pin 8 to the inside of the frame 9, of the gin. When the free end of lever 7 is moved in a direction away from the saws, it draws back the clamp arm 5 and frees it entirely from the curved member 1. The curved member 1 can then be turned up as much as may be desired by manipulating handle 3. The nozzle is closed and reestablished by raising handle 3 and is then clamped in operative position by placing a clamping arm 5 at each end of the gin over the curved member 1 and pushing lever 7 toward the saws until the toggle joint passes the dead center and the free end of lever 7 strikes and stops against the surface of the curved end 1 of air duct E, in which position the toggle is self locked until purposely moved, since when in this extreme position the centre of the toggle pin 6 has reached and passed a line between the centre 8 on which lever 7 turns and the lip 1ª of the nozzle.

It will be observed (see Fig. 2) that the lip 1ª of the curved sheet 1 is itself slightly curved outwardly. This construction is a feature greatly reducing frictional resistance to the air blast and thus increasing the speed of blast delivery and also negativing air eddies which are set up when the air escapes and expands at the narrowest point of the slot or nozzle.

We claim:

1. In a cotton gin, a compressed air duct, having a slot outlet between opposed walls, for delivering a stream of compressed air close and tangentially, to the path of the saw teeth, one wall of the outlet slot being pivoted for movement by the operator from an adjusted position without cutting the path of the saw teeth in its movement.

2. In a cotton gin, a compressed air duct having a slot outlet between opposed walls, for delivering a stream of compressed air close and tangentially, to the path of the saw teeth, the outer wall of the outlet slot being pivoted for movement by the operator from an adjusted position, without cutting the path of the saw teeth in its movement.

3. In a cotton gin, a compressed air duct, having a slot outlet between opposed walls, for delivering a stream of compressed air close and tangentially, to the path of the saw teeth, the outer wall of the outlet slot being pivoted for movement by the operator from an adjusted position, without cutting the path of the saw teeth in its movement; means for securing the outer wall of the outlet slot in adjusted position.

Signed at Dallas, Texas, this 4th day of October, 1921.

OSCAR J. WALTON.
JASPER L. BEARD.